(12) United States Patent
Feng et al.

(10) Patent No.: US 10,372,427 B2
(45) Date of Patent: Aug. 6, 2019

(54) OPEN PLATFORM FOR PROVIDING ABILITY TO END USERS

(71) Applicant: HYDATA, Santa Clara, CA (US)

(72) Inventors: Yicun Feng, Beijing (CN); Bai Yang, Cupertino, CA (US); Yun Xia, Beijing (CN); Cheng Liu, Beijing (CN); Longhui Li, Beijing (CN); Yujie Zhang, Beijing (CN); Yuan Fan, Beijing (CN); Yi Xu, Beijing (CN)

(73) Assignee: HYDATA, Santa Clara, CA (US)

( * ) Notice: Subject to any disclaimer, the term of this patent is extended or adjusted under 35 U.S.C. 154(b) by 0 days.

(21) Appl. No.: 15/857,149

(22) Filed: Dec. 28, 2017

(65) Prior Publication Data

US 2019/0155584 A1  May 23, 2019

(30) Foreign Application Priority Data

Nov. 21, 2017  (CN) .......................... 2017 1 1163662

(51) Int. Cl.
*G06F 8/36* (2018.01)
*G06F 8/76* (2018.01)

(52) U.S. Cl.
CPC . *G06F 8/36* (2013.01); *G06F 8/76* (2013.01)

(58) Field of Classification Search
CPC ..... G06F 8/36; G06F 8/76; G06F 8/10; G06F 8/60; G06F 8/70; G06F 8/71; G06F 8/73; G06F 8/00; G06F 8/20; G06F 8/24; G06F 8/30; G06F 8/65
USPC ................. 717/120–123, 168–178, 100–109
See application file for complete search history.

(56) References Cited

U.S. PATENT DOCUMENTS

| | | | |
|---|---|---|---|
| 6,529,909 B1 * | 3/2003 | Bowman-Amuah | G06F 16/258 |
| 7,996,814 B1 * | 8/2011 | Qureshi | G06F 11/079 717/120 |
| 8,095,911 B2 * | 1/2012 | Ronen | G06F 8/36 717/122 |
| 8,250,169 B2 * | 8/2012 | Beringer | G06Q 10/10 709/217 |
| 8,725,839 B2 * | 5/2014 | Madduri | G06F 8/61 709/219 |
| 8,850,420 B2 * | 9/2014 | Yousouf | G06F 8/65 709/219 |

(Continued)

OTHER PUBLICATIONS

Oracle, "How to Write Doc Comments for the Javadoc Tool," http://www.oracle.com/technetwork/articles/java/index-137868.html, Jun. 9, 2017, last retrieved from https://web.archive.org/web/20170609034140/http://www.oracle.com/technetwork/articles/java/index-137868.htnnl on Mar. 18, 2019 (Year: 2017).*

(Continued)

*Primary Examiner* — Andrew M. Lyons
(74) *Attorney, Agent, or Firm* — Zilka-Kotab, P.C.

(57) ABSTRACT

A method according to one embodiment includes importing a plurality of resources associated with an entity, receiving, from the entity, a request for an application that performs predetermined functionality, creating a functionality definition, utilizing the request, determining, from the plurality of resources associated with the entity, one or more necessary resources for implementing the functionality definition, constructing the application that performs the predetermined functionality, utilizing the one or more necessary resources, and implementing the application in an environment of the entity.

9 Claims, 12 Drawing Sheets

(56) References Cited

U.S. PATENT DOCUMENTS

| | | | | |
|---|---|---|---|---|
| 8,863,075 B2* | 10/2014 | Said | | G06F 8/436 |
| | | | | 717/103 |
| 8,881,128 B2* | 11/2014 | Ierullo | | G06Q 10/06 |
| | | | | 717/168 |
| 9,286,040 B2* | 3/2016 | Halley | | G06F 8/41 |
| 2002/0059446 A1* | 5/2002 | Visalli | | H04L 29/06 |
| | | | | 709/236 |
| 2004/0255291 A1* | 12/2004 | Sierer | | G06F 8/61 |
| | | | | 717/174 |
| 2006/0074734 A1* | 4/2006 | Shukla | | G06F 8/10 |
| | | | | 717/107 |
| 2007/0061799 A1* | 3/2007 | Kimmerly | | G06F 8/20 |
| | | | | 717/168 |
| 2007/0266384 A1* | 11/2007 | Labrou | | G06F 8/00 |
| | | | | 718/100 |
| 2008/0178147 A1* | 7/2008 | Meliksetian | | G06F 8/36 |
| | | | | 717/107 |
| 2008/0189240 A1* | 8/2008 | Mullins | | G06F 16/25 |
| 2009/0006416 A1* | 1/2009 | Krahulec | | G06F 17/30893 |
| 2009/0177957 A1* | 7/2009 | Bouillet | | G06F 8/30 |
| | | | | 715/230 |
| 2009/0210855 A1* | 8/2009 | Ramanathan | | G06F 8/36 |
| | | | | 717/102 |
| 2009/0222805 A1* | 9/2009 | Faus | | G06F 8/61 |
| | | | | 717/168 |
| 2009/0249290 A1* | 10/2009 | Jenkins | | G06Q 10/063 |
| | | | | 717/109 |
| 2009/0254912 A1* | 10/2009 | Roundtree | | G06F 8/61 |
| | | | | 718/102 |
| 2010/0082556 A1* | 4/2010 | Srinivasan | | G06F 8/72 |
| | | | | 707/693 |
| 2010/0115490 A1* | 5/2010 | Wilcock | | G06F 8/10 |
| | | | | 717/104 |
| 2010/0269092 A1* | 10/2010 | Dorman | | G06F 9/45512 |
| | | | | 717/106 |
| 2010/0293536 A1* | 11/2010 | Nikitin | | G06F 21/10 |
| | | | | 717/168 |
| 2011/0023022 A1* | 1/2011 | Harper | | G06F 8/36 |
| | | | | 717/170 |
| 2011/0088011 A1* | 4/2011 | Ouali | | G06F 8/10 |
| | | | | 717/105 |
| 2011/0161912 A1* | 6/2011 | Eteminan | | G06F 8/20 |
| | | | | 717/101 |
| 2011/0265077 A1* | 10/2011 | Collison | | G06F 8/71 |
| | | | | 717/172 |
| 2011/0265081 A1* | 10/2011 | Lucovsky | | G06F 8/60 |
| | | | | 717/177 |
| 2012/0030672 A1* | 2/2012 | Zygmuntowicz | | G06F 8/60 |
| | | | | 718/1 |
| 2012/0124547 A1* | 5/2012 | Halbedel | | G06F 17/30964 |
| | | | | 717/100 |
| 2012/0158743 A1* | 6/2012 | Gardner | | G06F 17/30038 |
| | | | | 707/748 |
| 2012/0185821 A1* | 7/2012 | Yaseen | | G06F 8/10 |
| | | | | 717/105 |
| 2012/0266156 A1* | 10/2012 | Spivak | | G06F 9/5055 |
| | | | | 717/172 |
| 2013/0042258 A1* | 2/2013 | Rector | | G06F 8/51 |
| | | | | 719/328 |
| 2013/0152072 A1* | 6/2013 | Fernandez-Ruiz | | G06F 8/60 |
| | | | | 717/175 |
| 2013/0305218 A1* | 11/2013 | Hirsch | | G06F 8/30 |
| | | | | 717/106 |
| 2014/0019934 A1* | 1/2014 | Schlarb | | G06F 8/72 |
| | | | | 717/104 |
| 2014/0047084 A1* | 2/2014 | Breternitz | | H04L 67/1008 |
| | | | | 709/221 |
| 2014/0047117 A1* | 2/2014 | Jensen-Horne | | G06F 9/5061 |
| | | | | 709/226 |
| 2014/0047412 A1* | 2/2014 | Schlarb | | G06Q 10/06 |
| | | | | 717/106 |
| 2014/0047413 A1* | 2/2014 | Sheive | | H04L 65/403 |
| | | | | 717/110 |
| 2014/0068546 A1* | 3/2014 | Balasubramanian | | G06F 8/61 |
| | | | | 717/104 |
| 2014/0075345 A1* | 3/2014 | Fippel | | G06F 8/34 |
| | | | | 715/762 |
| 2014/0280484 A1* | 9/2014 | Klemenz | | H04L 67/10 |
| | | | | 709/203 |
| 2014/0282404 A1* | 9/2014 | Gonsalves | | H04W 4/50 |
| | | | | 717/123 |
| 2014/0304678 A1* | 10/2014 | Zhang | | G06F 8/36 |
| | | | | 717/105 |
| 2014/0337816 A1* | 11/2014 | Chiluvuri | | G06F 8/36 |
| | | | | 717/107 |
| 2015/0039682 A1* | 2/2015 | Chasman | | H04L 67/2857 |
| | | | | 709/203 |
| 2015/0095880 A1* | 4/2015 | Lee | | G06F 8/30 |
| | | | | 717/108 |
| 2015/0154567 A1* | 6/2015 | Kang | | G06Q 10/20 |
| | | | | 705/305 |
| 2015/0186132 A1* | 7/2015 | Oliveri | | G06F 8/34 |
| | | | | 717/120 |
| 2015/0205602 A1* | 7/2015 | Prismon | | G06F 8/71 |
| | | | | 717/121 |
| 2015/0261517 A1* | 9/2015 | Hodge | | G06F 8/60 |
| | | | | 717/176 |
| 2015/0317350 A1* | 11/2015 | Roy-Faderman | | G06F 16/2365 |
| | | | | 707/702 |
| 2016/0065417 A1* | 3/2016 | Sapuram | | G06Q 30/0631 |
| | | | | 709/223 |
| 2016/0092179 A1* | 3/2016 | Straub | | G06F 8/71 |
| | | | | 717/107 |
| 2016/0092499 A1* | 3/2016 | Leigh | | G06F 8/38 |
| | | | | 707/740 |
| 2016/0127454 A1* | 5/2016 | Maheshwari | | H04L 47/70 |
| 2016/0134616 A1* | 5/2016 | Koushik | | H04L 63/0807 |
| | | | | 726/9 |
| 2016/0188302 A1* | 6/2016 | Fredrick | | G06F 8/34 |
| | | | | 717/107 |
| 2016/0277312 A1* | 9/2016 | Ferris | | G06F 9/5072 |
| 2016/0321064 A1* | 11/2016 | Sankaranarasimhan | | G06F 16/951 |
| 2016/0378439 A1* | 12/2016 | Straub | | G06F 8/34 |
| | | | | 717/107 |
| 2017/0006135 A1* | 1/2017 | Siebel | | H04L 67/02 |
| 2017/0032050 A1* | 2/2017 | Kol | | G06F 3/0482 |
| 2017/0060537 A1* | 3/2017 | MacK | | G06F 8/20 |
| 2017/0212748 A1* | 7/2017 | Agnew | | G06F 8/65 |
| 2018/0136913 A1* | 5/2018 | Mayer | | G06F 8/36 |
| 2018/0217830 A1* | 8/2018 | Bartolotta | | G06F 8/61 |

OTHER PUBLICATIONS

S. R. Heiyanthuduwage, R. Schwitter and M. A. Orgun, "A learning ontology with metadata and user profiles for enhancing accessibility of resources," 2016 IEEE Conference on e-Learning, e-Management and e-Services (IC3e), Langkawi, 2016, pp. 85-90. (Year: 2016).*

C. Hsu, M. Bouziane, L. Rattner and L. Yee, "Information resources management in heterogeneous, distributed environments: A metadatabase approach," in IEEE Transactions on Software Engineering, vol. 17, No. 6, pp. 604-625, Jun. 1991. (Year: 1991).*

H. Msheik, A. Abran and E. Lefebvre, "Compositional structured component model: handling selective functional composition," Proceedings. 30th Euromicro Conference, 2004., Rennes, France, 2004, pp. 74-81. (Year: 2004).*

A. Mukherjee, B. Esfandiari and N. Arthorne, "U-P2P: a peer-to-peer system for description and discovery of resource-sharing communities," Proceedings 22nd International Conference on Distributed Computing Systems Workshops, Vienna, Austria, 2002, pp. 701-705. (Year: 2002).*

Microsoft, "Office 365," Nov. 23, 2017, as retrieved by the Internet Archive Wayback Machine, pp. 1-9, https://web.archive.org/web/20171123030930/https://www.microsoft.com/en-us/store/b/office365.

* cited by examiner

OPEN PLATFORM FOR PROVIDING ABILITY TO END USERS

FIELD OF THE INVENTION

The present invention relates to application development, and more particularly to developing customized software as a service (SaaS) applications.

BACKGROUND

Software products are increasingly being released as a service. For example, many instances of productivity software and data analysis software are released under the SaaS platform. However, customers having different backgrounds, environments, and requirements may react differently to a single version of software. Since users may have many different requirements, it may be difficult for the single version of software to fulfill the needs of many different users.

There is therefore a need to be able to quickly develop software to fit the needs of a variety of different users.

SUMMARY

A computer program embodied on a tangible computer readable medium according to one embodiment includes computer code for importing a plurality of resources associated with an entity, computer code for receiving, from the entity, a request for an application that performs predetermined functionality, computer code for creating a functionality definition, utilizing the request, computer code for determining, from the plurality of resources associated with the entity, one or more necessary resources for implementing the functionality definition, computer code for constructing the application that performs the predetermined functionality, utilizing the one or more necessary resources, and computer code for implementing the application in an environment of the entity.

According to another embodiment, a method includes importing a plurality of resources associated with an entity, receiving, from the entity, a request for an application that performs predetermined functionality, creating a functionality definition, utilizing the request, determining, from the plurality of resources associated with the entity, one or more necessary resources for implementing the functionality definition, constructing the application that performs the predetermined functionality, utilizing the one or more necessary resources, and implementing the application in an environment of the entity.

A system according to another embodiment includes a processor for importing a plurality of resources associated with an entity, receiving, from the entity, a request for an application that performs predetermined functionality, creating a functionality definition, utilizing the request, determining, from the plurality of resources associated with the entity, one or more necessary resources for implementing the functionality definition, constructing the application that performs the predetermined functionality, utilizing the one or more necessary resources, and implementing the application in an environment of the entity.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Figure 1:
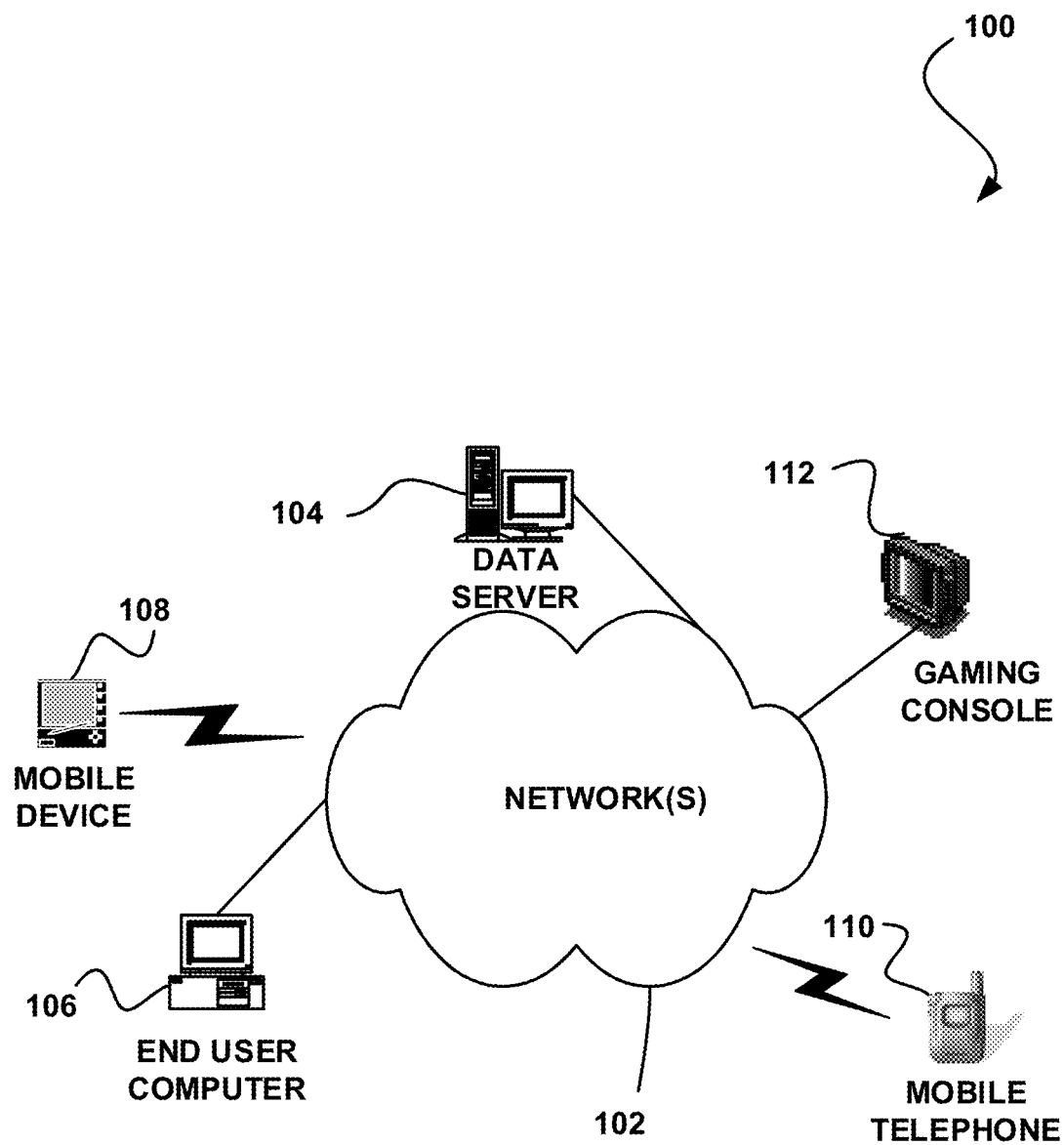
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, laptop computer, and/or any other type of logic. Still yet, various other devices may be coupled to the network 102 including a mobile device 108 (e.g., a tablet, a portable gaming device, etc.), a mobile phone device 110, a gaming console 112 (e.g., a dedicated console, a media device that enables gameplay, etc.), etc.

Figure 2:
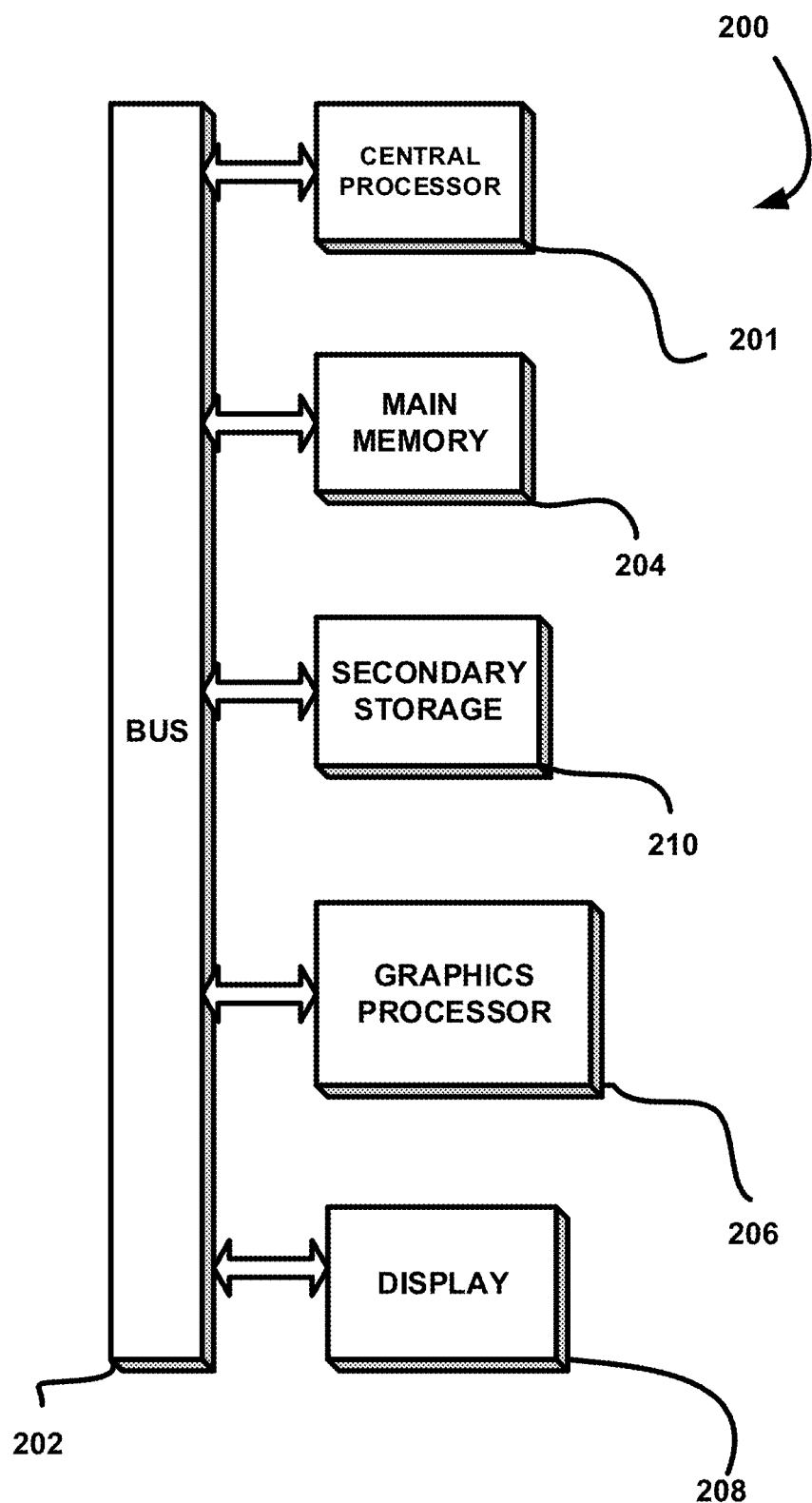
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a USB drive, a magnetic tape drive, a compact disk drive, etc. The removable storage drive reads from and/or writes to a removable storage unit in a well-known manner.

Computer programs, or computer control logic algorithms, may be stored in the secondary storage 210 and be loaded to the main memory 204 during execution time, for that matter. Such computer programs, when executed, enable the system 200 to perform various functions (to be set forth below, for example). One or more computer programs may be embodied on a tangible computer readable medium. Examples of tangible computer readable media include, but are not limited to, memory 204, storage 210, volatile or non-volatile storage, etc. Additional examples of tangible computer readable media include, but are not limited to, portable storage media such as a USB drive, a disc, a cartridge, a non-volatile random access memory card, etc. Tangible computer readable media may also be non-transitory.

Figure 3:
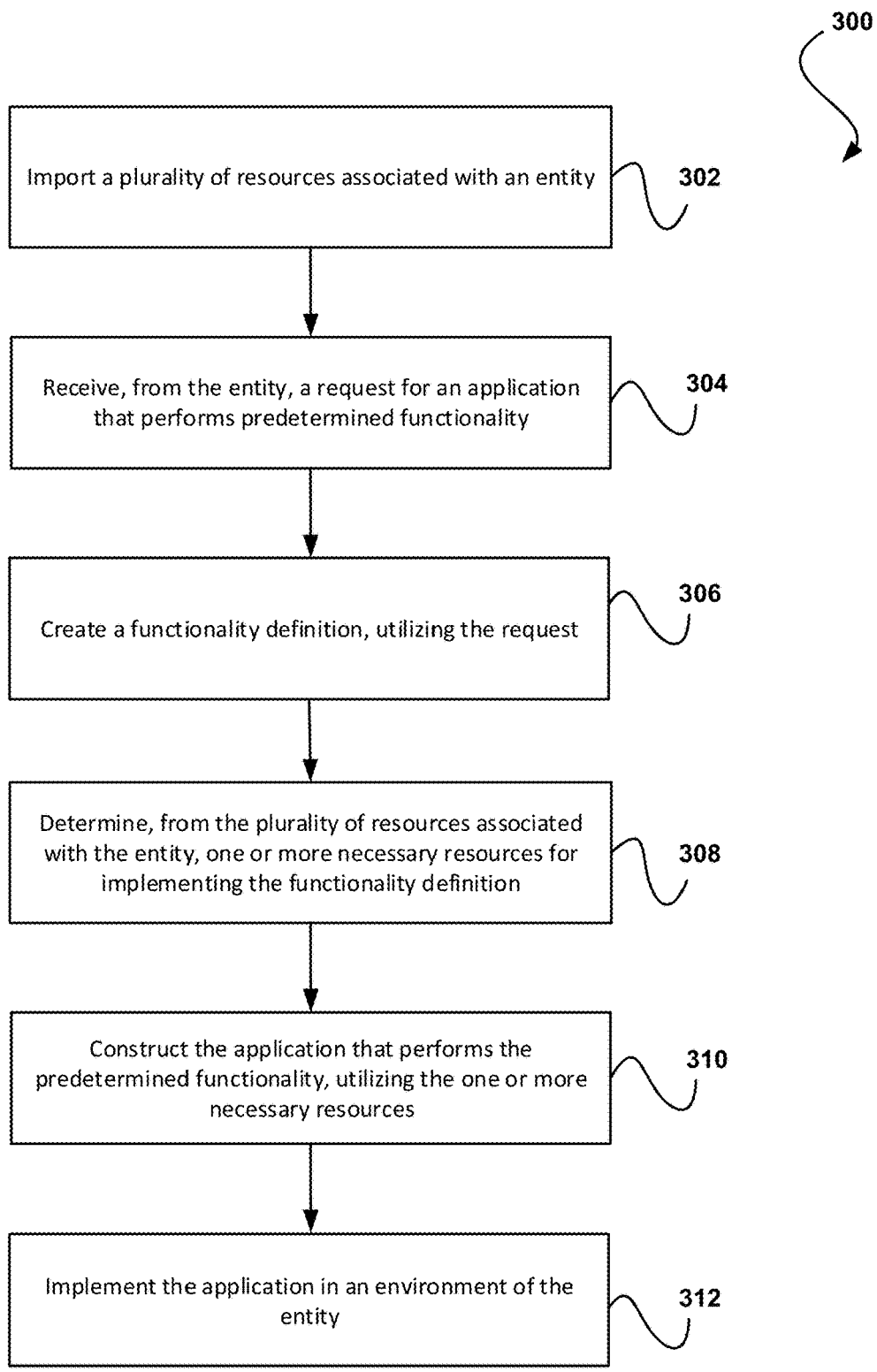
FIG. 3 illustrates a method for dynamically constructing an application for an entity, in accordance with one embodiment.

FIG. 3 illustrates a method 300 for dynamically constructing an application for an entity, in accordance with one embodiment. As an option, the method 300 may be carried out in the context of the details of FIGS. 1-2 and 4. Of course, however, the method 300 may be carried out in any desired environment. Further, the aforementioned definitions may equally apply to the description below.

As shown in operation 302, a plurality of resources associated with an entity are imported. In one embodiment, the entity may include an individual, a business, etc. In another embodiment, the importing may include identifying and retrieving a plurality of resources that are available to the entity. In yet another embodiment, the resources may be owned by the entity, leased by the entity, provided as a service to the entity in exchange for a periodic license fee, etc.

Additionally, in one embodiment, the resources may include hardware (e.g., computing/processing resources, monitoring hardware (e.g., weather monitoring hardware, traffic monitoring hardware, etc.), communications hardware, etc.). In another embodiment, the resources may include software (e.g., one or more operating systems or interfaces installed in hardware, one or more cloud-based services subscribed to by the entity, etc.). In yet another embodiment, the resources may include structured data (e.g., monitored data that is filtered and/or organized according to one or more predetermined criteria, etc.) and/or unstructured data (e.g., raw monitored data that has not been processed, etc.).

Further, in one embodiment, the resources may include audio data (e.g., one or more audio recordings made by monitoring hardware or received as part of a service, etc.), video data (e.g., one or more video recordings made by monitoring hardware or received as part of a service, etc.), and/or stream data. In another embodiment, the resources may include applications systems (custom and/or standard, such as mapping applications, sensor monitoring and reporting applications, GPS implementation applications, date/time applications, etc.), application tools, and/or a knowledge base of one or more employees of the entity (e.g., proficiency with predetermined software, etc.).

Further still, in one embodiment, the resource may be imported into a development platform (e.g., an open architecture, a cloud-based computing environment, etc.). For example, the resource may be saved as an object (e.g., a file) within the development platform. In another example, one or more characteristics of the resource may be saved in association with the object (e.g., as metadata, etc.). In yet another example, the characteristics may include name of the resource, ownership of the resource (e.g., whether an associated entity owns, leases, or licenses the resource, etc.), ownership limitations (e.g., a duration of an existing license for the resource), a description of the resource, data to be input to and/or output from the resource, a type and/or structure of data in the resource, etc.

Also, in one embodiment, the resource may also be updated once in the development platform. For example, one or more characteristics of the resource may be altered. In another embodiment, the resource may also be deleted once in the development platform. For example, the resource may be deleted when it is determined that the resource is not necessary for the implementing a functionality definition for the entity.

In addition, as shown in operation 304, a request is received from the entity for an application that performs predetermined functionality. In one embodiment, the request may be received at the development platform. In another embodiment, the request may include a description of the predetermined functionality (e.g., one or more requested abilities, etc.) desired by the entity. In yet another embodiment, the application may include a software as a service (SaaS) application.

Furthermore, in one embodiment, the functionality may include one or more abilities desired by the entity. For example, the requested functionality may include an ability to view one or more data streams (e.g., weather, time, news, map data, entity-specific data streams, etc.), an ability to perform predetermined data processing (e.g., processing and/or conversion of structured or unstructured data, etc.), an ability to perform one or more predetermined actions (e.g., send email, send text messages, etc.), etc.

Further still, as shown in operation 306, a functionality definition is created, utilizing the request. In one embodiment, the functionality definition may be created within the development platform. In another embodiment, creating the functionality definition may include creating an object (e.g., a functionality definition object). For example, creating the functionality definition may include adding metadata to the object describing the predetermined functionality and/or storing the metadata and the object within the development platform.

Also, in one embodiment, creating the functionality definition may include comparing the request to a plurality of stored functionality definition objects. For example, creating the functionality definition may include comparing the predetermined functionality to metadata associated with stored functionality definition objects. In another embodiment, a stored functionality definition object containing at least a predetermined amount of metadata matching the predetermined functionality of the requested application may be selected. This stored functionality definition object may be duplicated and used as a template.

Additionally, as shown in operation 308, one or more necessary resources for implementing the functionality definition are determined from the plurality of resources associated with the entity. In one embodiment, the determining may include associating the necessary resources with the functionality definition. For example, the determining may include adding metadata describing the necessary resource objects, linking the necessary resource objects to the functionality definition object, etc.

Further, in one embodiment, the determining may include analyzing the functionality definition to determine necessary resources. This analyzing may be performed manually or automatically/dynamically. In another embodiment, the determining may include comparing the functionality definition to other stored functionality definitions. For example, the other stored functionality definitions may have associated metadata describing predetermined functionality, as well as associated metadata indicating necessary resources for implementing that functionality. In another example, if there are a predetermined number of matching metadata elements describing predetermined functionality match between the current functionality definition and the stored functionality definition, one or more of the metadata indicating necessary resources for implementing that functionality may be extracted from the stored functionality definition and saved in the current functionality definition.

Further still, in one embodiment, the determining may include analyzing all stored functionality definitions to determine relationships between predetermined functionality and necessary resources. For example, associated metadata describing predetermined functionality as well as necessary resources for implementing that functionality may be analyzed. In another example, results of the analysis may include an association between predetermined functionality and necessary resources.

Also, in one embodiment, if the functionality definition is duplicated from a previously stored object, the functionality definition may include metadata from the previously stored object indicating one or more resources necessary for implementing the previously stored functionality definition. This metadata may be reused within the current functionality definition.

In addition, in one embodiment, an additional resource not associated with the entity may be identified that is necessary for implementing the functionality definition. For example, the additional resource may include a resource associated with one or more entities other than the entity requesting the application. In another embodiment, it may be determined whether the additional resource can be used by the entity requesting the application. For example, use of the resource by the entity may include one or more prerequisites (e.g., payment of a one-time or recurring license fee, signing of an agreement, etc.). In yet another embodiment, if the additional resource is associated with multiple entities, the additional resource with the smallest number of prerequisites (e.g., lowest cost, etc.) may be identified.

Furthermore, in one embodiment, the additional resource may be presented to the entity for approval before associating the additional resource with the functionality definition. In another embodiment, the additional resource may be automatically associated with the functionality definition if one or more prerequisites are met (e.g., a cost of the additional resource is below a threshold cost, etc.).

Further still, as shown in operation 310, the application that performs the predetermined functionality is constructed, utilizing the one or more necessary resources. In one embodiment, constructing the application may include configuring the one or more necessary resources for use within the application. In another embodiment, constructing the application may include presenting a design graphical user interface (GUI) to a user that includes visualizations of one or more necessary resources determined for the functionality definition.

Also, in one embodiment, the visualizations may include visualizations of stream data, audio data, video data, etc. In another embodiment, the visualizations may be dragged and dropped into an exemplary display of the application. In yet another embodiment, a configuration of the visualization may be adjusted. In still another embodiment, user visualization selections, placement, and configuration adjustment may be received and stored in association with the application.

Additionally, in one embodiment, constructing the application may include determining one or more methods for analyzing and presenting one or more necessary resources. For example, if the necessary resource is data (e.g., a data stream, unstructured data, structured data, etc.), a process (either new or previously stored) may be determined to analyze and present the data. In another example, the process may be stored in association with the application.

Further, in one embodiment, constructing the application may include determining a means of accessing one or more of the necessary resources within the application (e.g., via a selection box of the application GUI, a pull-down menu of the application GUI, etc.). In another embodiment, the means of accessing the necessary resources may be stored in association with the application.

Further still, as shown in operation 312, the application is implemented in an environment of the entity. In one embodiment, the implementing may include deploying the application to the environment. For example, the environment may include one or more computing systems of the entity. In another embodiment, the implementing may include making the application available to one or more computing systems of the entity via a software as a service (SaaS) model.

Also, in one embodiment, the implementing may include determining necessary support software for the application or preliminary actions to be performed in the environment of the entity. For example, the necessary support software may include additional software (e.g., drivers, patches, communication software, etc.) necessary to be installed on computing systems of the entity in order to fully utilize the application to meet the predetermined functionality requested from the application. In another example, the preliminary actions to be performed may include data preparation, data cleansing, etc.

In addition, in one embodiment, the implementing may include identifying whether the computing systems of the entity contain the necessary support software and have performed the preliminary actions. For example, the implementing may include automatically installing the necessary support software in the computing systems of the entity. In one embodiment, the necessary support software may be automatically installed if one or more predetermined criteria are met (e.g., cost of support software is less than a predetermined amount, size of predetermined software is less than a predetermined size, predetermined software has passed one or more predetermined security checks, etc.). In another embodiment, the implementing may include performing the preliminary actions if not done so by the entity.

Furthermore, in one embodiment, the implementing may include identifying whether one or more individuals (e.g., staff, employees, etc.) have a sufficient knowledge base to utilize the application. In another embodiment, if it is determined that one or more individuals do not have a sufficient knowledge base, one or more education means (e.g., online or in-person tutorials or classes, etc.) may be suggested to the entity.

Further still, in one embodiment, the application and/or the functionality definition may be stored within the development platform. For example, the application be stored as an object in association with the functionality definition, associated necessary resources, and configuration of those resources (all of which may be stored as metadata within the object). In another example, the application and/or the functionality definition may be reused in the future, included in future functionality/resource association analysis, etc. For example, the application and/or the functionality definition may be reused in response to a request from another entity.

Also, in one embodiment, feedback may be received from the entity for the application. In another embodiment, this feedback may be converted into a numerical score, a weighting score, etc. In yet another embodiment, this feedback and associated score may be stored in association with the application (e.g., as metadata) and may be used during future analysis to make recommendations. For example, one or more of a functionality definition, associated necessary resources, and configuration of those resources for an application with a higher weight may be recommended before one or more of a functionality definition, associated necessary resources, and configuration of those resources for an application with a lower weight.

In this way, software may be easily customized and deployed for an entity by analyzing application functionality required by the entity and correlating it to resources owned by and available to that entity. This analysis may consider prior functionality and resource correlations in order to improve an effectiveness of a resulting application.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Software as a service (SaaS), is a popular way of releasing software. However, it may be important to determine what kind of service customers really need. If the same service is provided for different customers, it may be important to determine whether the software is useful for all of them.

It is therefore important for software that is released to be able to provide ability (e.g., predefined functionality) to end customers, based on their requirements and available resources. For example, after users get productivity software via a subscription, they may gain the ability to process text files, spreadsheet files, etc. However, if the customer does not have resources such as internet connectivity access or the knowledge of how to use the productivity software, the effectiveness of such software may be reduced.

An open development platform may be implemented that focuses on providing abilities to users. The development platform may be used to quickly develop graphical user interface (GUI) applications. It may support the creation of charts from user data, the use of control modules in an application, etc. The development platform may manage all resources that customers have; it may define ability users need; it may develop an application system with drag-and-drop; it may deploy the application to a user's environment.

Figure 4:
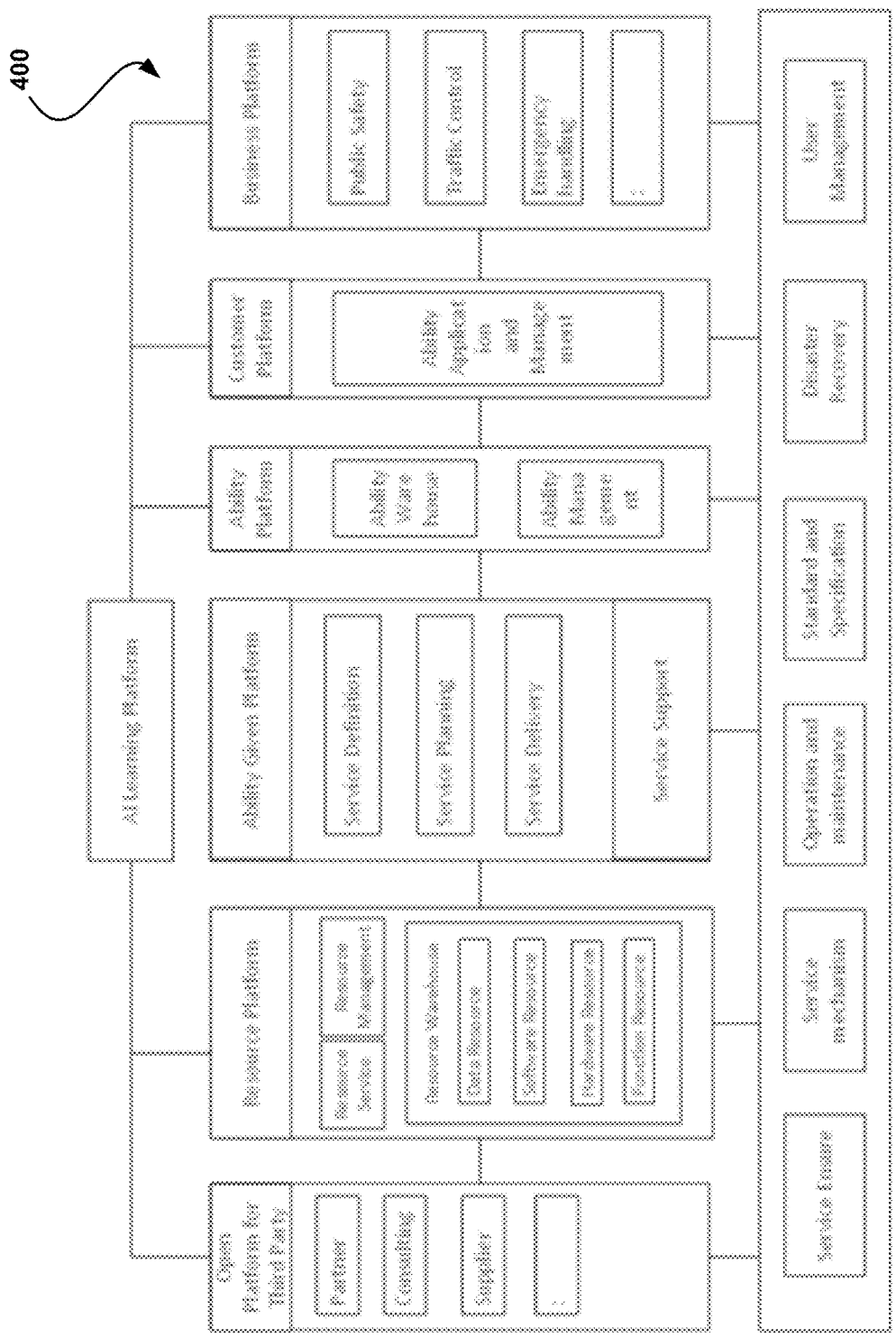
FIG. 4 illustrates an exemplary architecture for an ability service development platform, in accordance with one embodiment.

With the user's knowledge about the business systems, the users may have the ability to resolve their business problems. The created application may also be used as a new resource and put back into the development platform. If other users need similar ability, an application system may be quickly customized to grant the ability to the new users. An exemplary architecture 400 for an ability service development platform is shown in FIG. 4.

A platform is provided that can quickly generate a GUI application for customers. This platform enables the generation of charts based on user data, and the integration of charts, texts, photos and videos together. It can also reuse the business systems we developed for different customers.

With the knowledge of our visualization platform and the knowledge about the business systems, the development platform may be updated. This platform is an open platform that helps customers to gain new abilities. This new platform focuses on providing customers with new abilities with created software. The development platform may include an open interface, where different users may connect their resources to the development platform. The development platform may also enable management of all resources available to customers. After the customers provide one or more needed abilities by conveying their problems, the development platform may identify the resources that are needed to provide such abilities. After that, the development platform may be used to plan how to use the resources to meet customer needs. After one or more applications are created to resolve the customer problem, they are dispatched to a customer environment. With the help of the applications, the customer may have the ability to resolve their problems. From the beginning, where different resources are identified and stored within to the development platform, to the end, where applications are dispatched to customer environments, a focus is maintained on letting the customer have new abilities to resolve their problems.

Adding Resources to the Development Platform

Figure 5:
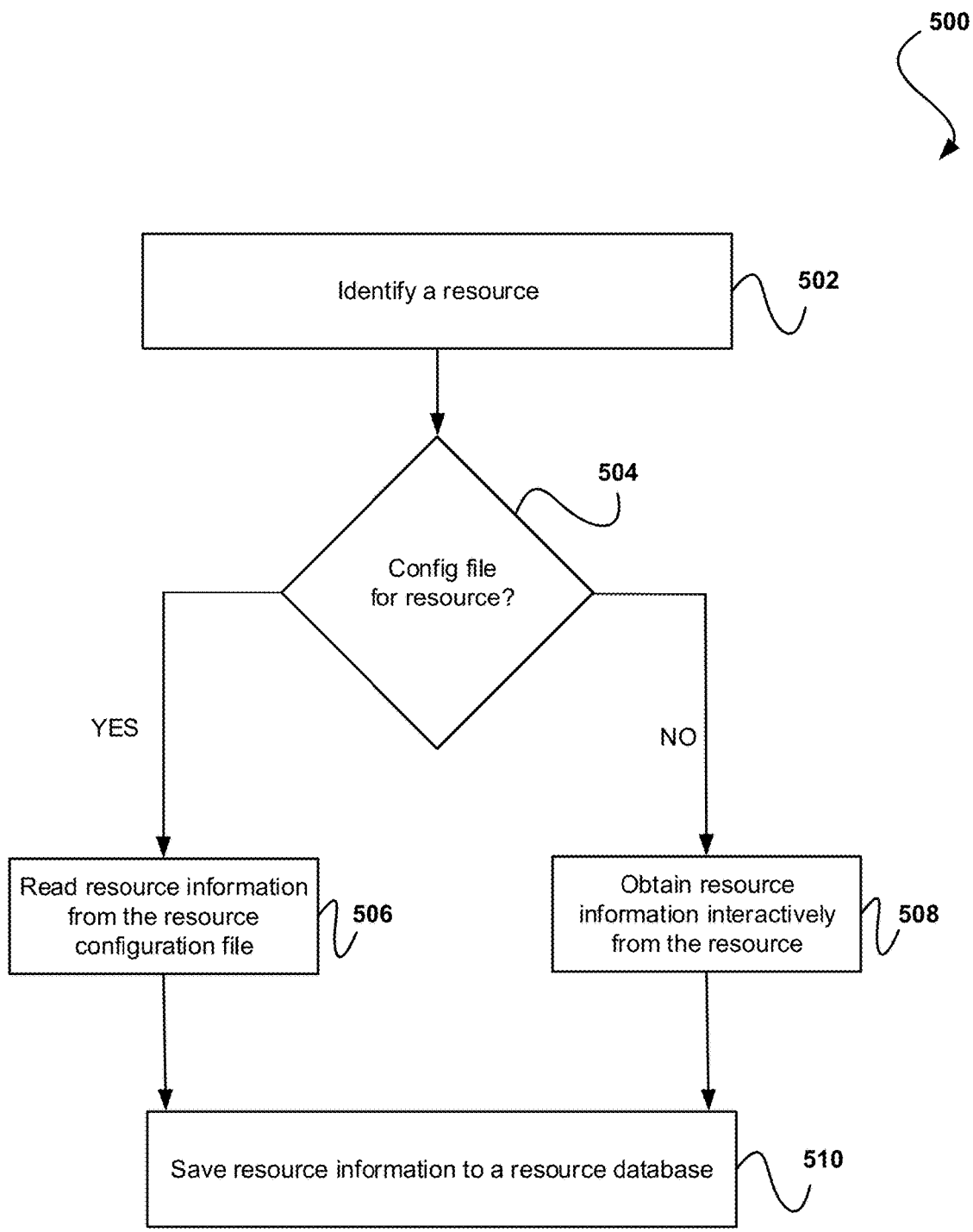
FIG. 5 illustrates a method for adding one or more resources for an entity to a development platform, in accordance with one embodiment.

FIG. 5 illustrates a method 500 for adding one or more resources for an entity to a development platform, in accordance with one embodiment. As an option, the method 500 may be carried out in the context of the details of FIGS. 1-2 and 4. Of course, however, the method 500 may be carried out in any desired environment. Further, the aforementioned definitions may equally apply to the description below.

As shown in operation 502, a resource is identified. Additionally, in decision 504, it is determined whether a resource configuration file exists for the resource. Table 1 includes an exemplary resource configuration file, in accordance with one embodiment. Of course, it should be noted that the resource configuration file shown in Table 1 is set forth for illustrative purposes only, and thus should not be construed as limiting in any manner.

TABLE 1

```
<?xml version="1.0"?>
<resources>
    <resource id="sd101">
        <type>Structured Data</Type>
        <title>2010 population data</title>
        <publish_date>2011-01-20</publish_date>
        <description>population data by zip code</description>
    </resource>
    <resource id="camera205">
        <type>Video</type>
        <format>mp4</format>
        <title>Camera 205 at intersection A and B</title>
        <description>The 5th camera face to south at intersection A
            and B
```

TABLE 1-continued

```
        </description>
    </resource>
    <resource id="tool500">
        <type>tool</type>
        <NewResource>Y</NewResource>
        <HowToRun>run "getWeatherInfo" from shell</HowToRun>
        <title>GetWeatherInfo</title>
        <description>Tool to get weather information of the
            City
        </description>
    </resource>
</resources>
```

If it is determined in decision 504 that a resource configuration file exists for the resource, then in operation 506, resource information is read from the resource configuration file. If it is determined in decision 504 that a resource configuration file does not exist for the resource, then in operation 508, resource information is obtained interactively from the resource.

Additionally, as shown in operation 510, the resource information is saved to a resource database. In one embodiment, the resource information may be saved as metadata within a resource database of a development platform in association with an object representing the resource.

The new resources the development platform may manage include, but are not limited to, hardware, software, structured data, unstructured data, audio, video, stream data, application systems, tools, etc. New type of resources may also be added to the development platform. For example, when new hardware or a new tool is available, they may be added to the development platform. Information describing how to use the new resource may be extracted from existing documentation or through analysis and may be stored in the resource configure file.

Updating Resources within the Development Platform

Figure 6:
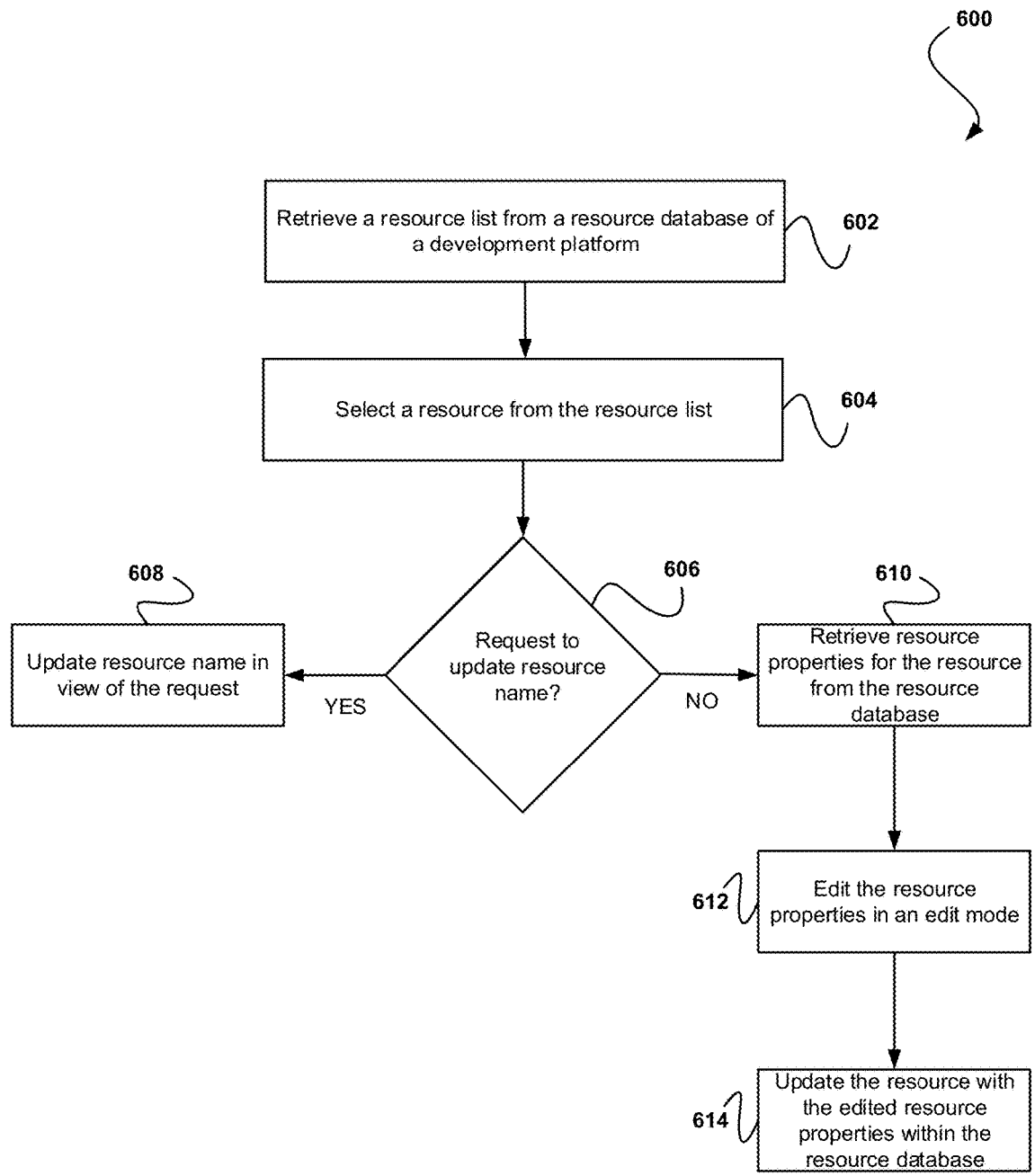
FIG. 6 illustrates a method for updating a resource stored within a development platform, in accordance with one embodiment.

After a resource has been added to the development platform, the resource name and properties may be updated. FIG. 6 illustrates a method 600 for updating a resource stored within a development platform, in accordance with one embodiment. As an option, the method 600 may be carried out in the context of the details of FIGS. 1-2 and 4. Of course, however, the method 600 may be carried out in any desired environment. Further, the aforementioned definitions may equally apply to the description below.

As shown in operation 602, a resource list is retrieved from a resource database of a development platform. Additionally, as shown in operation 604, a resource is selected from the resource list. Further, in decision 606, it is determined whether a request to update a resource name is received. If it is determined in decision 606 that a request to update a resource name is received, then in operation 608, the resource name is updated in view of the request.

Further still, if it is determined in decision 606 that a request to update a resource name is not received, then in operation 610, resource properties for the resource are retrieved from the resource database. Also, in operation 612, the resource properties are edited in an edit mode. In addition, in operation 614, the resource is updated with the edited resource properties within the resource database.

Deleting Resources from the Development Platform

Figure 7:
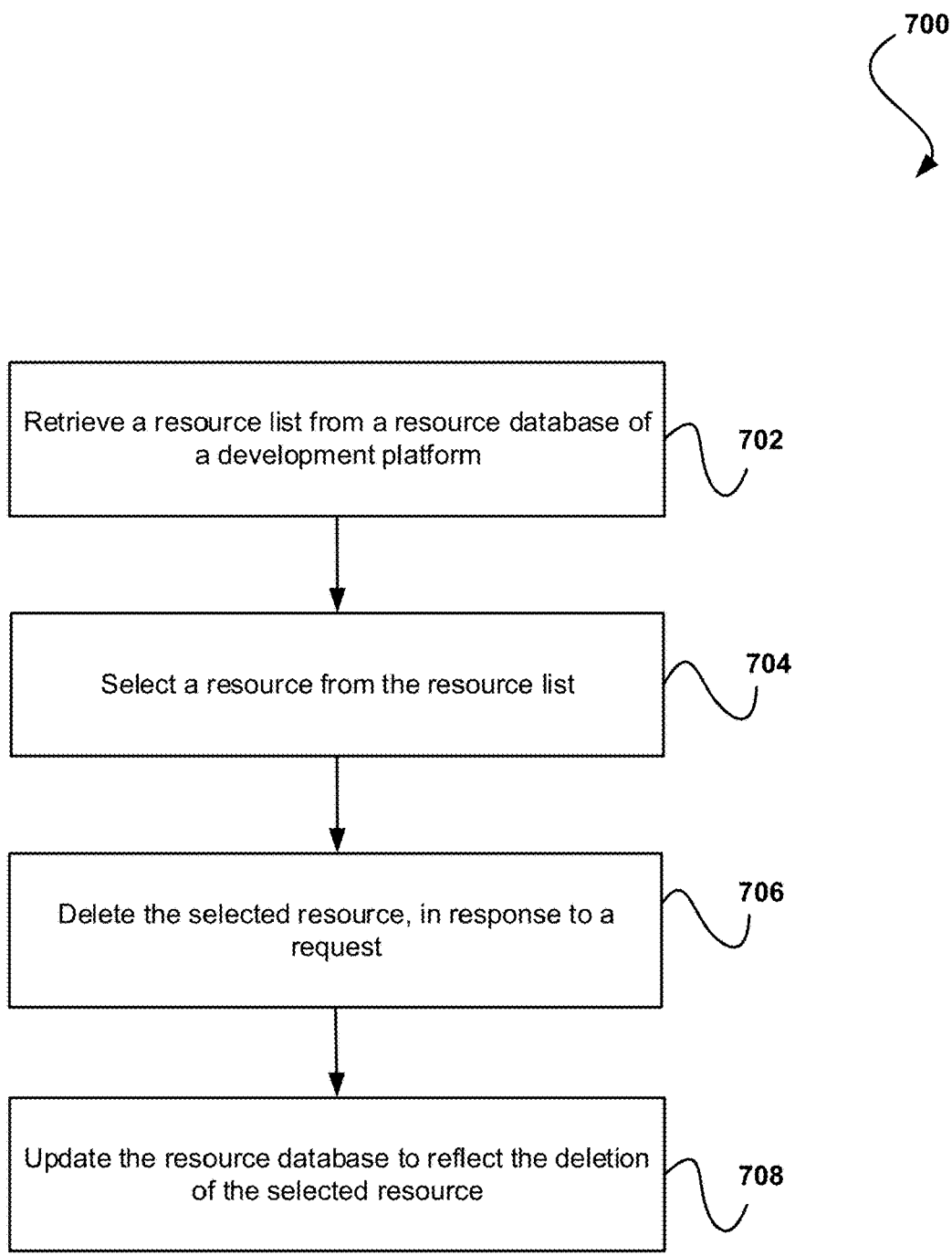
FIG. 7 illustrates a method for removing a resource stored within a development platform, in accordance with one embodiment.

When resources are not needed for customers, they may be removed from the development platform. FIG. 7 illustrates a method 700 for removing a resource stored within a development platform, in accordance with one embodiment. As an option, the method 700 may be carried out in the context of the details of FIGS. 1-2 and 4. Of course, however, the method 700 may be carried out in any desired environment. Further, the aforementioned definitions may equally apply to the description below.

As shown in operation 702, a resource list is retrieved from a resource database of a development platform. Additionally, as shown in operation 704, a resource is selected from the resource list. Further, as shown in operation 706, the selected resource is deleted, in response to a request. Further still, as shown in operation 708, the resource database is updated to reflect the deletion of the selected resource.

Retrieving Resources from the Development Platform

Figure 8:
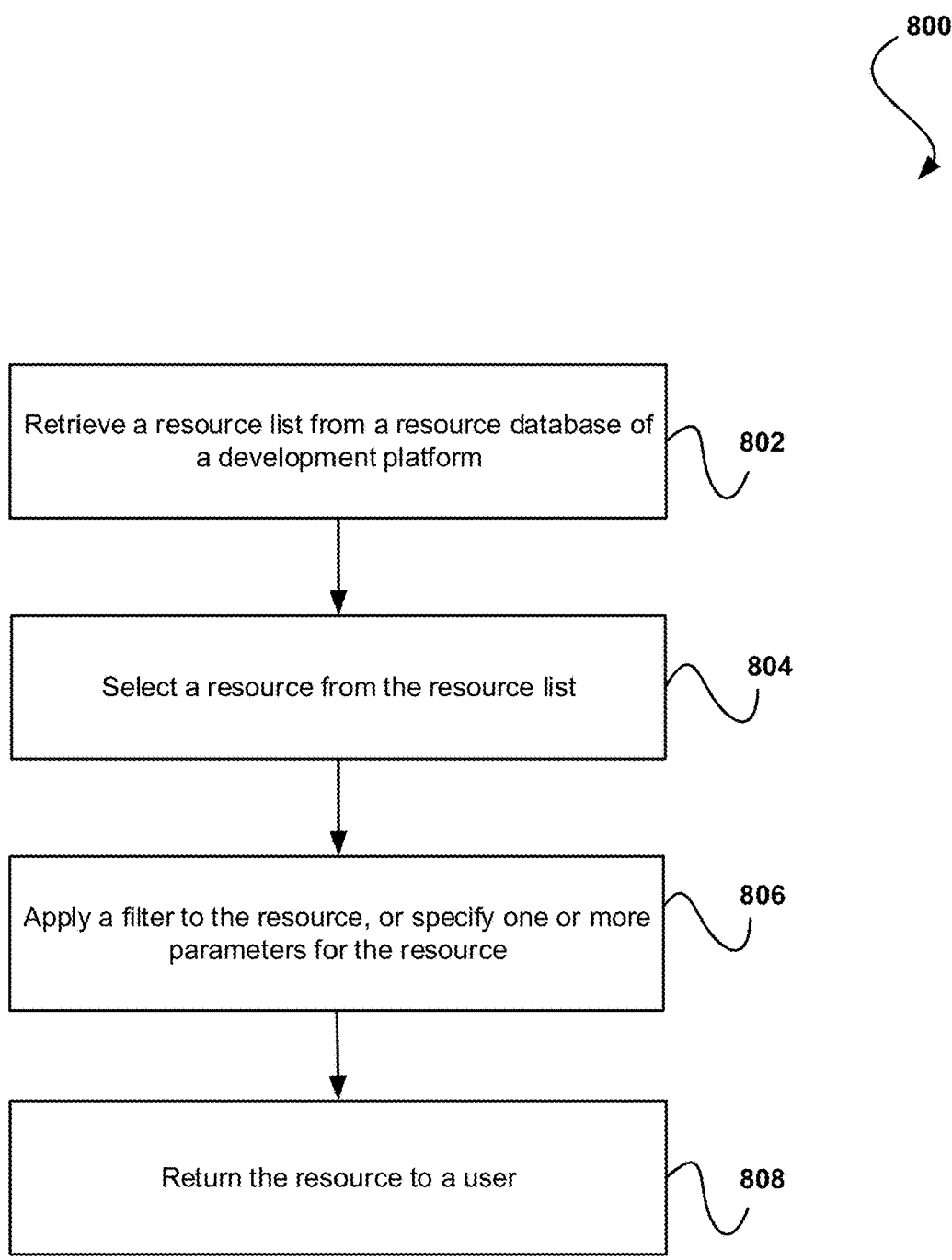
FIG. 8 illustrates a method for retrieving a resource stored within a development platform, in accordance with one embodiment.

When an application system is being built for a customer, the resources available to that customer may be retrieved from the development platform. FIG. 8 illustrates a method 800 for retrieving a resource stored within a development platform, in accordance with one embodiment. As an option, the method 800 may be carried out in the context of the details of FIGS. 1-2 and 4. Of course, however, the method 800 may be carried out in any desired environment. Further, the aforementioned definitions may equally apply to the description below.

As shown in operation 802, a resource list is retrieved from a resource database of a development platform. Additionally, as shown in operation 804, a resource is selected from the resource list. Further, as shown in operation 806, a filter is applied to the resource, or one or more parameters are specified for the resource. Further still, as shown in operation 808, the resource is returned to a user.

Adding a New Ability Definition

When a customer requests a software solution, a type of ability desired by the customer may be determined. The ability definition may already be defined within the development platform (e.g., the same ability has been provided to one or more other customers in the past); or a similar ability definition may be defined within the development platform. One or more existing ability definitions defined within the development platform may be reused or enhanced to create a new ability definition for the customer, or a new ability definition may be developed for the customer. After the new ability definition has been provided, the new ability definition may be added to the development platform.

Modifying an Existing Ability Definition

After a new ability definition has been added to the development platform, resources may be selected to implement the desired ability. If the current ability does not fully meet a customer's need, it may be enhanced by updating resources needed to provide the desired ability to the customer.

Figure 9:
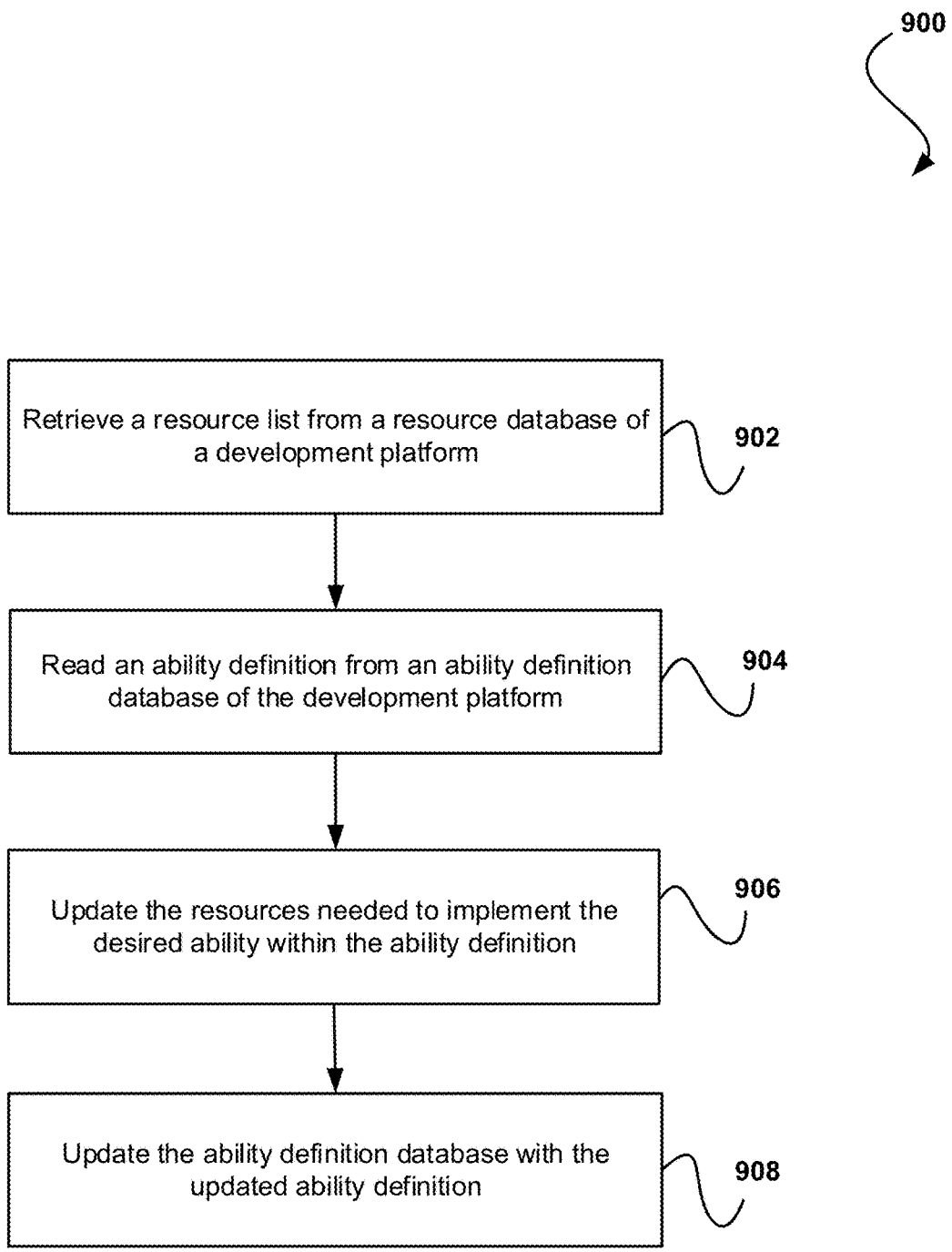
FIG. 9 illustrates a method for modifying an ability definition stored within a development platform, in accordance with one embodiment.

FIG. 9 illustrates a method 900 for modifying an ability definition stored within a development platform, in accordance with one embodiment. As an option, the method 900 may be carried out in the context of the details of FIGS. 1-2 and 4. Of course, however, the method 900 may be carried out in any desired environment. Further, the aforementioned definitions may equally apply to the description below.

As shown in operation 902, a resource list is retrieved from a resource database of a development platform. Additionally, as shown in operation 904, an ability definition is read from an ability definition database of the development platform. Further, as shown in operation 906, the resources needed to implement the desired ability are updated within the ability definition. This may include adding metadata describing one or more resources to an ability definition object, linking one or more resource objects to the ability definition object, etc. Further still, as shown in operation 908, the ability definition database is updated with the updated ability definition.

Service Planning

After resources needed to implement the desired ability are identified and stored in association with the definition of the desired ability, the resources may be used to build an application to provide the desired ability. Using the development platform, a customer may have clear visualization via a GUI. In one embodiment, all resources may be added and/or removed from the application using one or more drag-and-drop operations.

Figure 10:
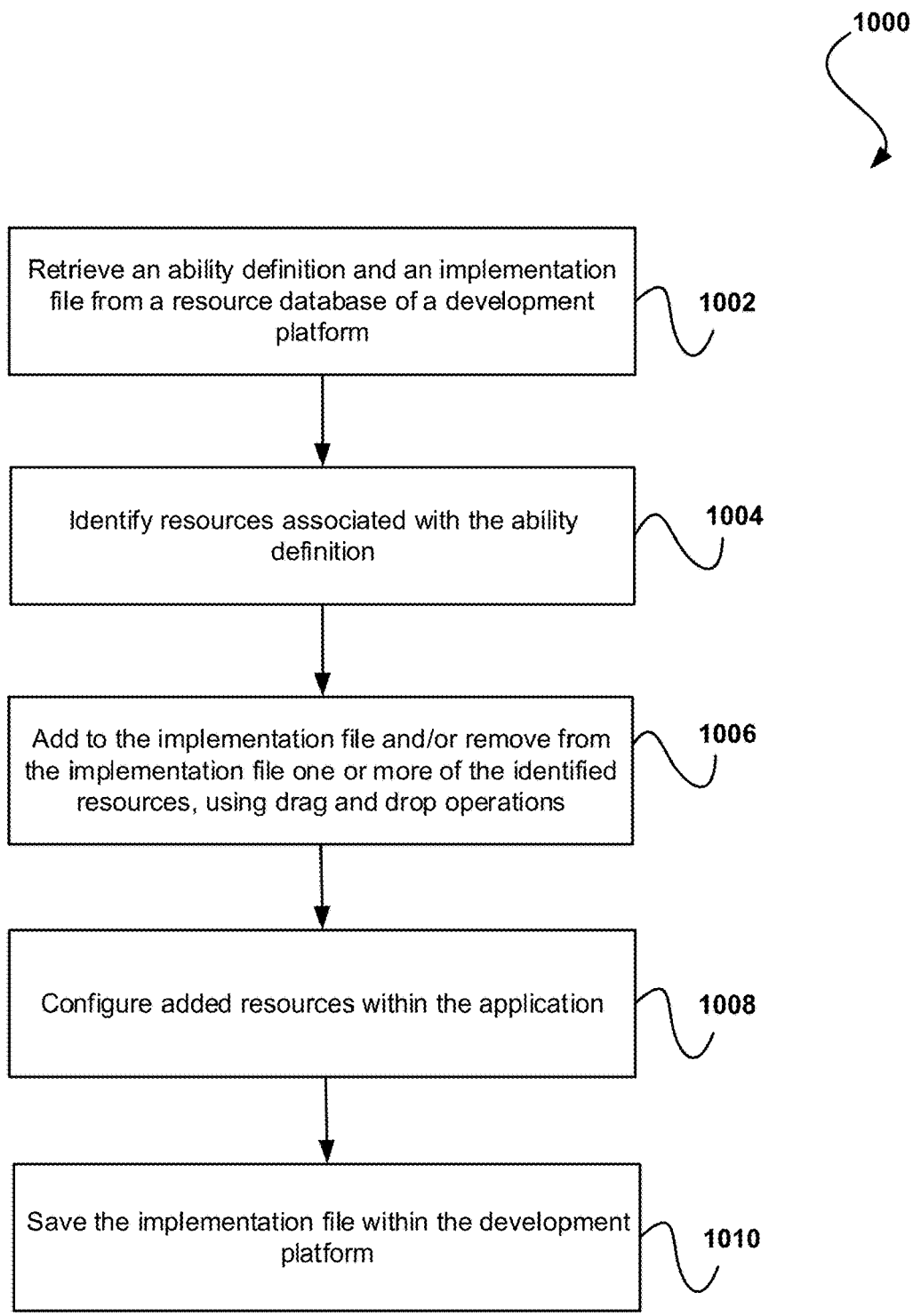
FIG. 10 illustrates a method for developing an application utilizing a stored ability definition, in accordance with one embodiment.

FIG. 10 illustrates a method 1000 for developing an application utilizing a stored ability definition, in accordance with one embodiment. As an option, the method 1000 may be carried out in the context of the details of FIGS. 1-2 and 4. Of course, however, the method 1000 may be carried out in any desired environment. Further, the aforementioned definitions may equally apply to the description below.

As shown in operation 1002, an ability definition and an implementation file are retrieved from a resource database of a development platform. In one embodiment, the implementation file may include a description of an application being developed. Additionally, as shown in operation 1004, resources associated with the ability definition are identified.

Further, as shown in operation 1006, one or more of the identified resources are added to and/or removed from the implementation file, using drag and drop operations. Further still, as shown in operation 1008, added resources are configured within the application. Also, as shown in operation 1010, the implementation file is saved within the development platform.

Figure 11:
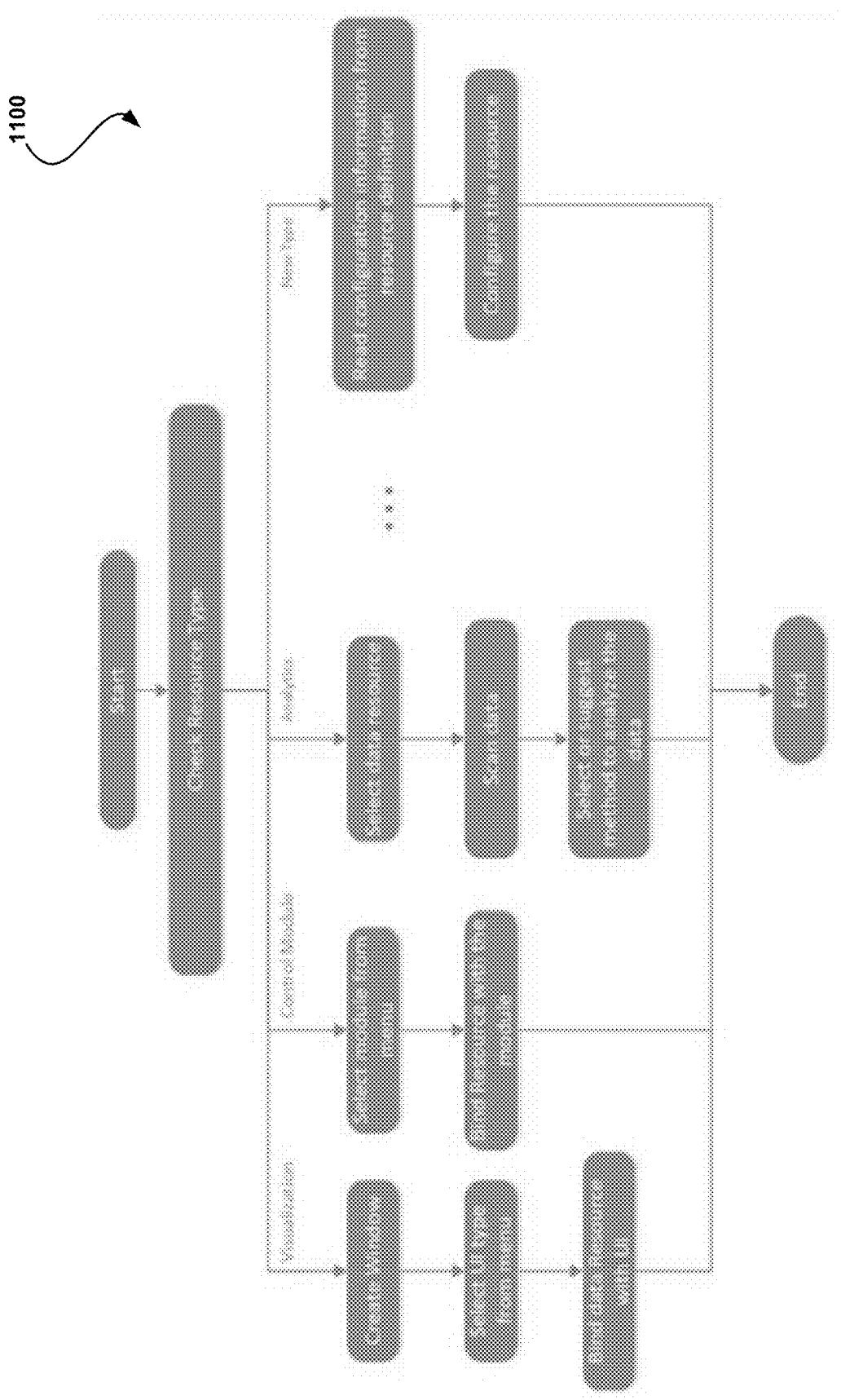
FIG. 11 illustrates exemplary flowchart for configuring resources within a development platform, in accordance with one embodiment.

An exemplary flowchart 1100 for configuring resources within a development platform is shown in FIG. 11. As an option, the flowchart 1100 may be carried out in the context of the details of FIGS. 1-2 and 4. Of course, however, the flowchart 1100 may be carried out in any desired environment. Further, the aforementioned definitions may equally apply to the description below.

Service Dispatch

After the application has been developed, it may be dispatched to the customer environment. All necessary support software may be checked and installed if they do not exist in the customer's environment. At the same time, the new ability may be added to the ability database within the development platform. When other customers need a similar ability, an application delivering such desired ability can be quickly developed and dispatched to their environment.

Figure 12:
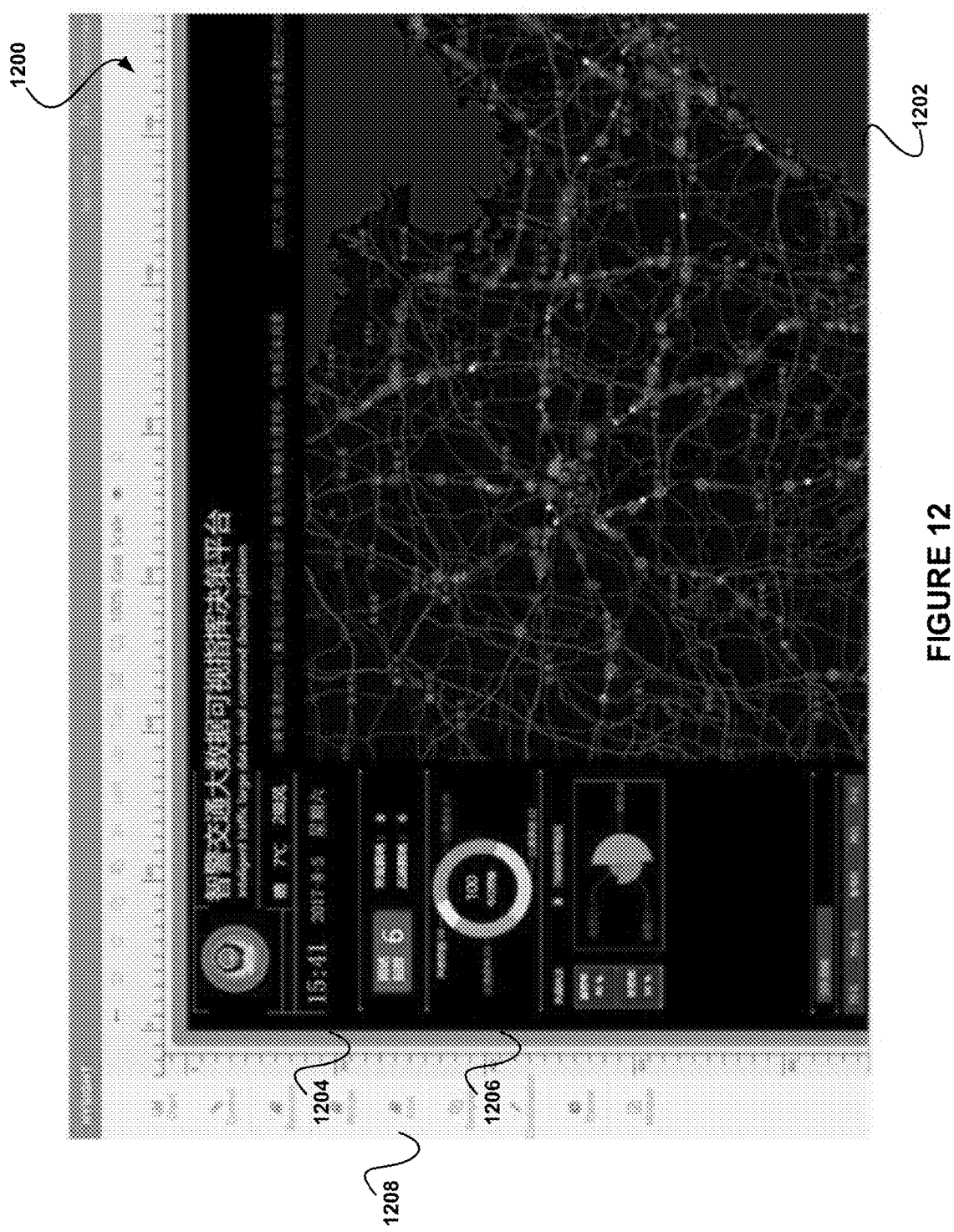
FIG. 12 illustrates an exemplary application system created utilizing an ability service development platform, in accordance with one embodiment.

An exemplary application system 1200 created utilizing an ability service development platform is shown in FIG. 12. The system 1200 includes a map resource 1202, date/time 1204 and other data information 1206 that the customer is interested in receiving. The application system 1200 may also include a drop-down menu 1208 that includes visualization functions used to develop the application. In one embodiment, all the resources associated with the ability definition may be available within in the menu, and all the resources may be dragged and dropped to the working area and configured.

Ability Warehouse and Ability Management

An ability warehouse within the development platform may contain all ability definitions that the development platform can provide. The warehouse may store information about which customers are associated with which ability definitions, what kind of resources are used within each ability definition, how resources are specifically implemented within an application to give the desired ability to a customer, etc. The ability definitions may be added, modified, deleted, and/or exported to or from the warehouse.

Ability Application and Business Platform

Some resources may only be available within a predetermined customer's environment. To fully grant the ability to the customer, the customer may also need an improved knowledge base, or certain work must be done within the customer's environment. For example, data cleansing work may need to be done to data within the customers' system before an application is deployed. In another example, deployment of an application may be associated with (and may be conditional upon) on one or more users having predetermined business knowledge.

It will be clear that the various features of the foregoing systems and/or methodologies may be combined in any way, creating a plurality of combinations from the descriptions presented above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising:
    computer code for importing a plurality of resources associated with an entity, where the plurality of resources include:
        computing resources,
        monitoring hardware,
        communications hardware,
        one or more operating systems or interfaces installed in hardware,
        one or more cloud-based services subscribed to by the entity,
        monitored data that is filtered and/or organized according to one or more predetermined criteria,
        monitored data that has not been processed,
        applications systems, and
        a knowledge base of one or more employees of the entity;
    computer code for saving a plurality of characteristics as metadata in association with each of the plurality of resources, the plurality of characteristics including:
        a name of the resource,
        an ownership of the resource,
        an ownership duration limitation,
        a description of the resource,
        data to be input to the resource,
        data to be output from the resource,
        a type of data in the resource, and
        a structure of data in the resource;
    computer code for saving the plurality of resources as an object;
    computer code for saving one or more characteristics of the object as metadata in association with the object;
    computer code for updating or deleting the object;
    computer code for receiving, from the entity, a request for an application that performs predetermined functionality, the predetermined functionality including one or more predetermined actions;
    computer code for creating a functionality definition, utilizing the request, including:
   creating a functionality definition object,
   adding metadata to the functionality definition object describing the predetermined functionality,
   comparing the predetermined functionality to metadata associated with stored functionality definition objects,
   selecting a stored functionality definition object containing at least a predetermined amount of metadata matching the predetermined functionality of the requested application, and
   duplicating the selected stored functionality definition object for use as a template;
computer code for determining, from the plurality of resources associated with the entity, one or more necessary resources for implementing the functionality definition;
computer code for constructing the application that performs the predetermined functionality, utilizing the one or more necessary resources and a development platform that includes an open architecture;
computer code for implementing the application in an environment of the entity, including determining necessary support software for the application or preliminary actions to be performed in the environment of the entity;
computer code for receiving feedback from the entity for the application;
computer code for storing the feedback in association with the application;
computer code for updating the functionality definition in response to determining that the predetermined functionality does not meet the entity's needs, including:
   retrieving a list of the plurality of resources, and
   adding metadata describing one or more of the plurality of resources to the functionality definition object; and
computer code for updating a functionality definition database with the updated functionality definition.

2. The computer program of claim 1, further comprising:
storing the application and the functionality definition within the development platform; and
reusing the application and the functionality definition in response to a request from another entity.

3. The computer program of claim 1, wherein the plurality of resources associated with the entity include all resources that are available to the entity, and the importing includes identifying and retrieving all the resources that are available to the entity.

4. The computer program of claim 1, wherein constructing the application includes configuring the one or more necessary resources for use within the application.

5. A method, comprising:
importing a plurality of resources associated with an entity, where the plurality of resources include:
   computing resources,
   monitoring hardware,
   communications hardware,
   one or more operating systems or interfaces installed in hardware,
   one or more cloud-based services subscribed to by the entity,
   monitored data that is filtered and/or organized according to one or more predetermined criteria,
   monitored data that has not been processed,
   applications systems, and
   a knowledge base of one or more employees of the entity;
saving a plurality of characteristics as metadata in association with each of the plurality of resources, the plurality of characteristics including:
   a name of the resource,
   an ownership of the resource,
   an ownership duration limitation,
   a description of the resource,
   data to be input to the resource,
   data to be output from the resource,
   a type of data in the resource, and
   a structure of data in the resource;
saving the plurality of resources as an object;
saving one or more characteristics of the object as metadata in association with the object;
updating or deleting the object;
receiving, from the entity, a request for an application that performs predetermined functionality, the predetermined functionality including one or more predetermined actions;
creating a functionality definition, utilizing the request, including:
   creating a functionality definition object,
   adding metadata to the functionality definition object describing the predetermined functionality,
   comparing the predetermined functionality to metadata associated with stored functionality definition objects,
   selecting a stored functionality definition object containing at least a predetermined amount of metadata matching the predetermined functionality of the requested application, and
   duplicating the selected stored functionality definition object for use as a template;
determining, from the plurality of resources associated with the entity, one or more necessary resources for implementing the functionality definition;
constructing the application that performs the predetermined functionality, utilizing the one or more necessary resources and a development platform that includes an open architecture;
implementing the application in an environment of the entity, including determining necessary support software for the application or preliminary actions to be performed in the environment of the entity;
receiving feedback from the entity for the application;
storing the feedback in association with the application;
updating the functionality definition in response to determining that the predetermined functionality does not meet the entity's needs, including:
   retrieving a list of the plurality of resources, and
   adding metadata describing one or more of the plurality of resources to the functionality definition object; and
updating a functionality definition database with the updated functionality definition.

6. The method of claim 5, further comprising:
storing the application and the functionality definition within the development platform; and
reusing the application and the functionality definition in response to a request from another entity.

7. The method of claim 5, wherein the plurality of resources associated with the entity include all resources that are available to the entity, and the importing includes identifying and retrieving all the resources that are available to the entity.

8. A system, comprising:
a processor for:
importing a plurality of resources associated with an entity, where the plurality of resources include:
computing resources,
monitoring hardware,
communications hardware,
one or more operating systems or interfaces installed in hardware,
one or more cloud-based services subscribed to by the entity,
monitored data that is filtered and/or organized according to one or more predetermined criteria,
monitored data that has not been processed,
applications systems, and
a knowledge base of one or more employees of the entity;
saving a plurality of characteristics as metadata in association with each of the plurality of resources, the plurality of characteristics including:
a name of the resource,
an ownership of the resource,
an ownership duration limitation,
a description of the resource,
data to be input to the resource,
data to be output from the resource,
a type of data in the resource, and
a structure of data in the resource;
saving the plurality of resources as an object;
saving one or more characteristics of the object as metadata in association with the object;
updating or deleting the object;
receiving, from the entity, a request for an application that performs predetermined functionality, the predetermined functionality including one or more predetermined actions;
creating a functionality definition, utilizing the request, including:
creating a functionality definition object,
adding metadata to the functionality definition object describing the predetermined functionality,
comparing the predetermined functionality to metadata associated with stored functionality definition objects,
selecting a stored functionality definition object containing at least a predetermined amount of metadata matching the predetermined functionality of the requested application, and
duplicating the selected stored functionality definition object for use as a template;
determining, from the plurality of resources associated with the entity, one or more necessary resources for implementing the functionality definition;
constructing the application that performs the predetermined functionality, utilizing the one or more necessary resources and a development platform that includes an open architecture;
implementing the application in an environment of the entity, including determining necessary support software for the application or preliminary actions to be performed in the environment of the entity;
receiving feedback from the entity for the application;
storing the feedback in association with the application;
updating the functionality definition in response to determining that the predetermined functionality does not meet the entity's needs, including:
retrieving a list of the plurality of resources, and
adding metadata describing one or more of the plurality of resources to the functionality definition object; and
updating a functionality definition database with the updated functionality definition.

9. The system of claim 8, wherein the processor is coupled to memory via a bus.

* * * * *